(12) United States Patent
Natanzon et al.

(10) Patent No.: US 8,745,004 B1
(45) Date of Patent: Jun. 3, 2014

(54) REVERTING AN OLD SNAPSHOT ON A PRODUCTION VOLUME WITHOUT A FULL SWEEP

(75) Inventors: Assaf Natanzon, Ramat Gan (IL); Benny Assouline, Rishon Letzion (IL)

(73) Assignee: EMC Corporation, Hopkinton, MA (US)

( * ) Notice: Subject to any disclaimer, the term of this patent is extended or adjusted under 35 U.S.C. 154(b) by 273 days.

(21) Appl. No.: 13/168,479

(22) Filed: Jun. 24, 2011

(51) Int. Cl.
*G06F 17/30* (2006.01)

(52) U.S. Cl.
CPC ............................... *G06F 17/30067* (2013.01)
USPC ............................ 707/639; 707/634; 707/640

(58) Field of Classification Search
CPC ................................................ G06F 17/30067
USPC ........................................ 707/639, 634, 640
See application file for complete search history.

(56) References Cited

U.S. PATENT DOCUMENTS

| | | | | |
|---|---|---|---|---|
| 5,155,824 A | * | 10/1992 | Edenfield et al. | 711/143 |
| 5,901,327 A | * | 5/1999 | Ofek | 710/5 |
| 6,076,148 A | * | 6/2000 | Kedem | 711/162 |
| 7,346,805 B1 | * | 3/2008 | Scharland et al. | 714/6.31 |
| 7,383,463 B2 | * | 6/2008 | Hayden et al. | 714/4.11 |
| 7,509,358 B1 | * | 3/2009 | Bingham et al. | 707/640 |
| 7,516,287 B2 | * | 4/2009 | Ahal et al. | 711/162 |
| 7,567,991 B2 | * | 7/2009 | Armangau et al. | 707/639 |
| 8,095,827 B2 | * | 1/2012 | Blea et al. | 714/19 |
| 8,214,612 B1 | * | 7/2012 | Natanzon | 711/162 |
| 8,359,491 B1 | * | 1/2013 | Bloomstein | 714/6.3 |
| 2005/0015663 A1 | * | 1/2005 | Armangau et al. | 714/15 |

FOREIGN PATENT DOCUMENTS

EP 1907972 B * 4/2012 ............. G06F 11/00

* cited by examiner

*Primary Examiner* — Shahid Alam
(74) *Attorney, Agent, or Firm* — Krishnendu Gupta; Gerald P. Kazanjian

(57) ABSTRACT

It may be beneficial to revert from the production volume V to the production snapshot S. Traditional approaches required a full sweep of production volume data when reverting to a snapshot (i.e., reinitialize all data, mark all data as dirty and start replicating to update the replication volume V' to what the production volume V stores (i.e., the former production snapshot S). However, example embodiments of the present invention provide for reverting from a production volume to a snapshot without requiring a full sweep of data in the production volume. Rather, example embodiments of the present invention stop replication of the production volume, notify a splitter of dirty location in the snapshot, synchronize the dirty locations with the replication volume and resume replication to the snapshot, thereby performing a minimal initialization.

14 Claims, 5 Drawing Sheets

REVERTING AN OLD SNAPSHOT ON A PRODUCTION VOLUME WITHOUT A FULL SWEEP

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention provide a method, an apparatus and a computer-program product for reverting from a production volume to a snapshot. The method includes notifying a splitter that a production volume is reverted to the snapshot. The method also includes notifying the splitter that the revert is completed and then resuming replicating to the snapshot.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
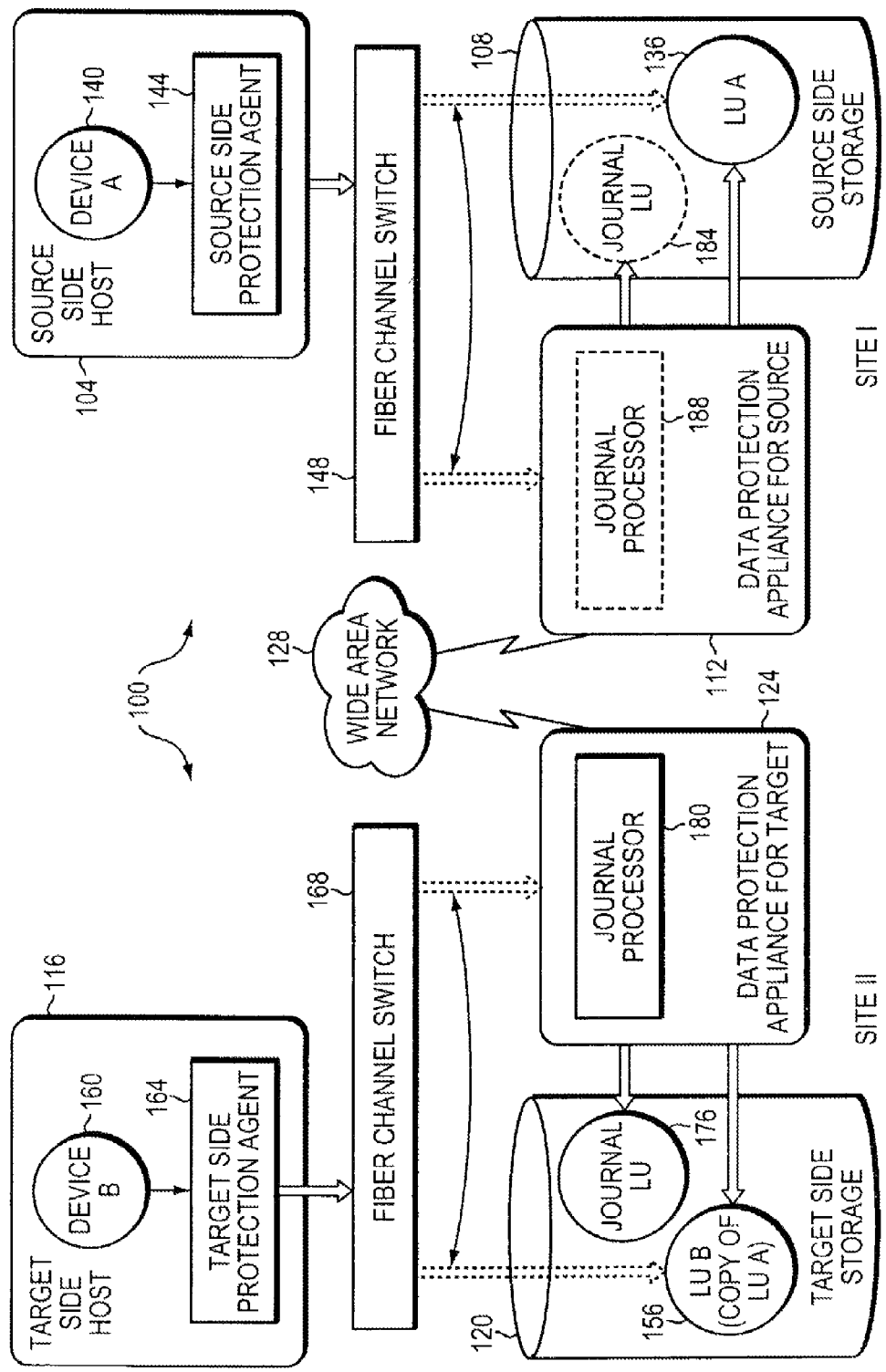
FIG. 1 is a simplified illustration of a data protection system, in accordance with an embodiment of the present invention.

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept 10 and split them to a DPA and to the storage array, fail 10 redirect 10 or do any other manipulation to the IO;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
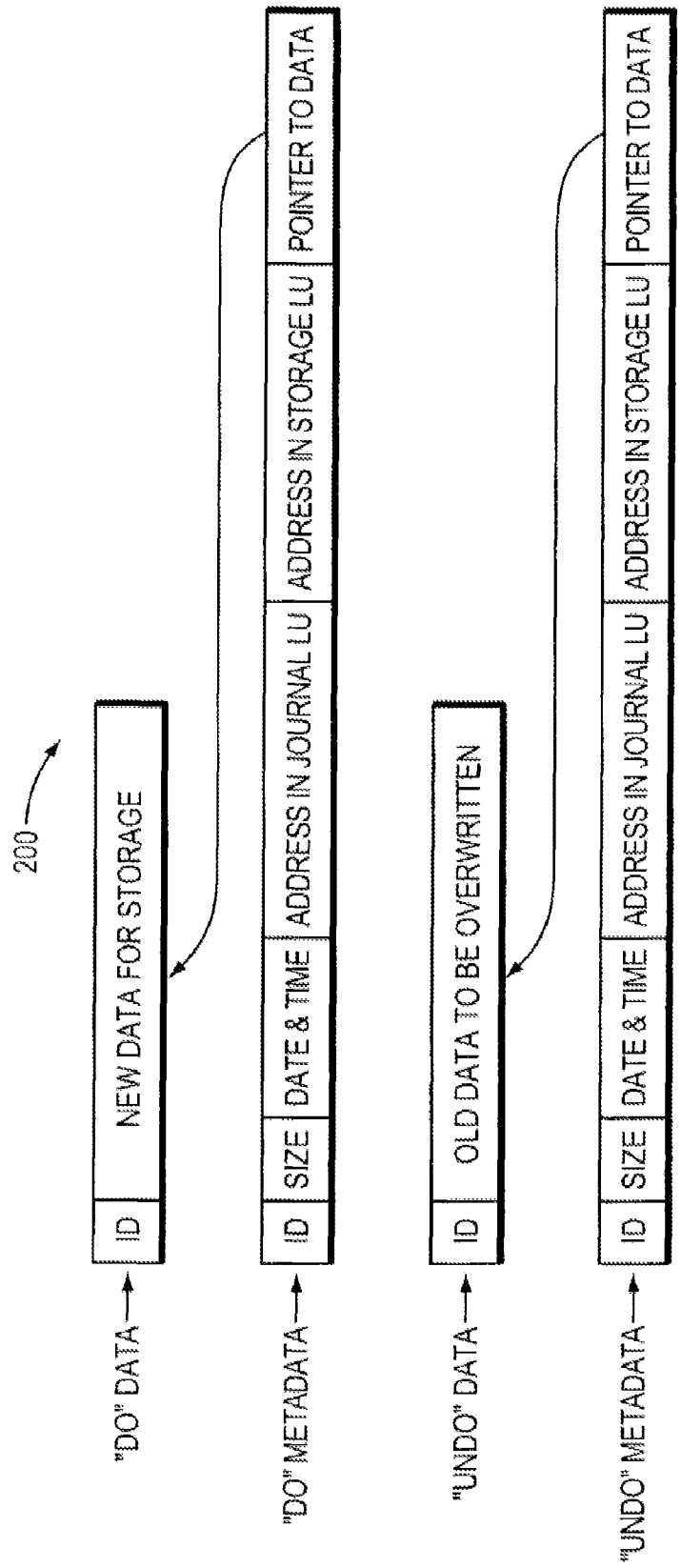
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
- one or more identifiers;
- a time stamp, which is the date & time at which the transaction was received by source side DPA 112;
- a write size, which is the size of the data block;
- a location in journal LU 176 where the data is entered;
- a location in LU B where the data is to be written; and
- the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Reverting an Old Snapshot on a Production Volume without a Full Sweep

Figure 3:
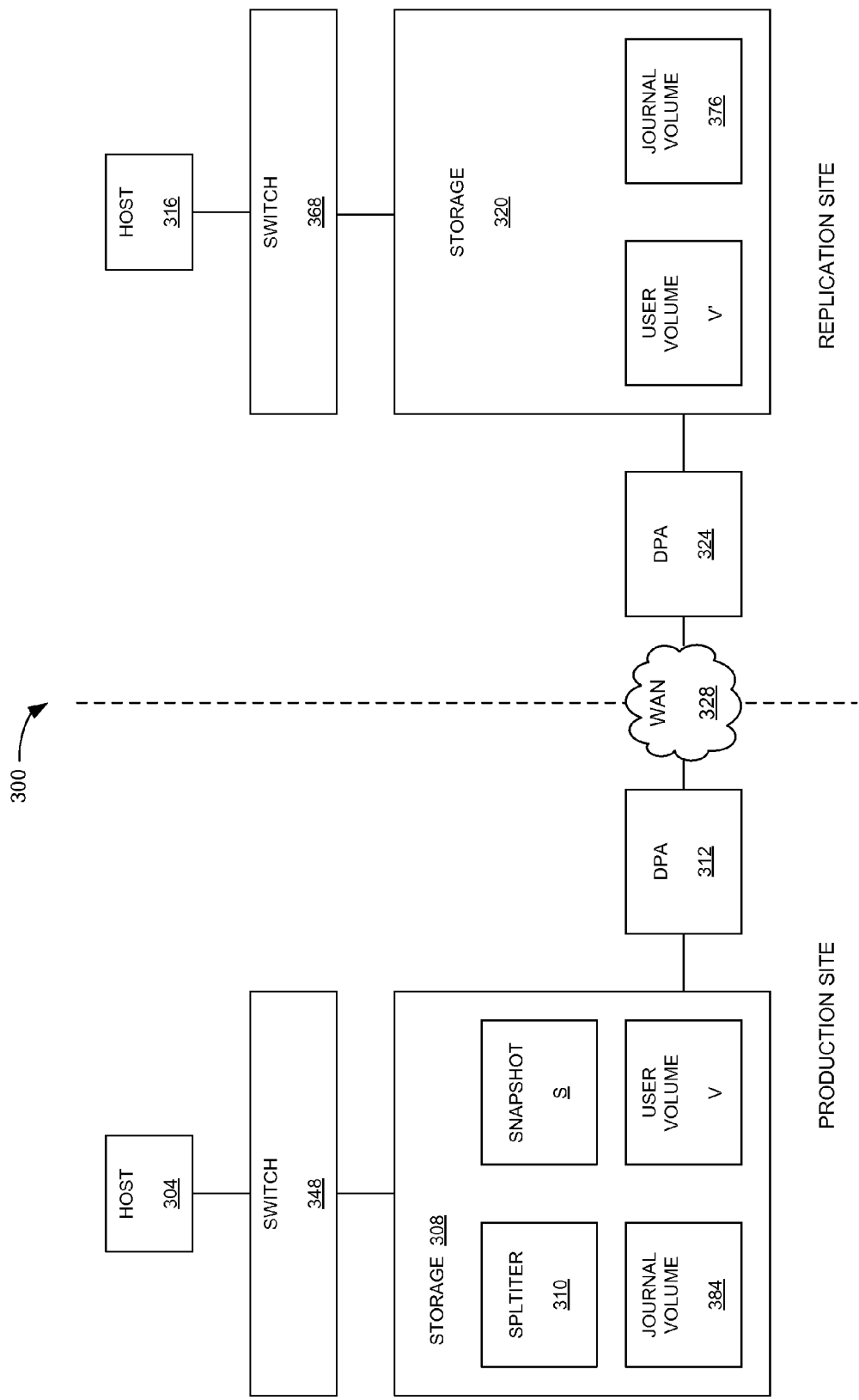
FIG. 3 is a block diagram illustrating an example system for reverting from a production volume to a snapshot according to an example embodiment of the present invention.

FIG. 3 is a block diagram of a replication environment 300 including a production site and a replication site. The production site includes storage 308 (e.g., a storage array) configured to receive I/O commands from a host 304 via a switch 348. A splitter 310 in the production site is configured to intercept the I/O commands from the host 304 and split them to both a user volume 336 at the production site and a data protection appliance (DPA) 312. Replication of the I/Os then occurs from the production site DPA 312 to the replications site DPA 324 to be maintained in the replications site journal 376. As described above, the production site DPA 312 performs replications across the WAN 328 to the replication volume 356 via the replication site DPA 324. Replication also may be to another device at the production site; in that case the production site DPA 312 behaves also as the replication site DPA 324). The replication volume 356 and a replication site journal 376 may be stored in replication site storage 320, such as a storage array. The replications site may also include a host 316 and a switch 368.

In certain scenarios, it may be beneficial to revert from the production volume V to the production snapshot S. For example, if the production volume V becomes corrupted, it would be advantageous to be able to revert to the snapshot S. Traditionally, former approaches required a full sweep of production volume data when reverting to a snapshot (i.e., reinitialize all data, mark all data as dirty and start replicating to update the replication volume V' to what the production volume V stores (i.e., the former production snapshot S).

However, example embodiments of the present invention provide for reverting from a production volume to a snapshot in a replication environment comprising a production site including the production volume and a splitter and a replication site including a replication volume. Example embodiments of the present invention do not require a full sweep of data in the production volume, as is traditionally required. Rather, example embodiments of the present invention perform a minimal initialization of locations in the production volume (i.e., the reverted snapshot) which are dirty (i.e., the locations in the reverted snapshot S which are different in than the volume V).

The description below is intended to be read with respect to the block diagram of FIG. 3 in conjunction with the flow diagram of FIGS. 4A-4D illustrating embodiment methods for reverting from a production volume to a snapshot. Reverting from the production volume V to the production snapshot S is transparent at the production site because the transition occurs immediately. However, the revert is not transparent at the replication site because the replication connection between the production volume V and replication volume V' is broken in transitioning from the production volume V to the production snapshot S, where the snapshot S is at a different point in time than the replication volume V'.

Figure 4:
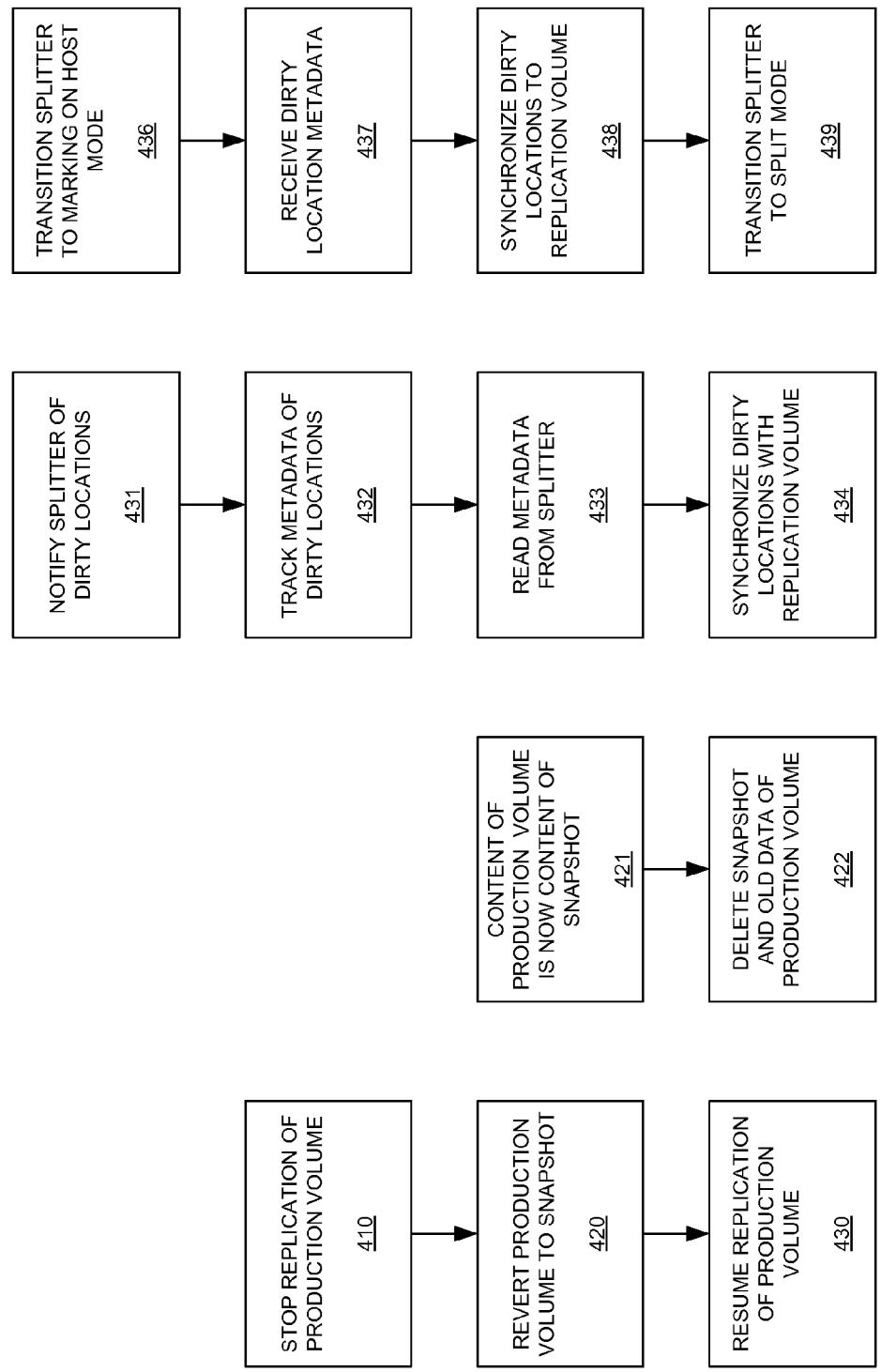
FIGS. 4A-4D are flow diagrams illustrating respective example methods for reverting from a production volume to a snapshot according to an example embodiment of the present invention.

Accordingly, in an example embodiment of the present invention illustrated in FIGS. 3 and 4A, the storage 308 notifies the splitter 310 that the production volume V requires reverting to the snapshot S, for example, if the production volume V has become corrupted, or for any other reason. The splitter 310 then stops replication of the production volume V (410). For example, when the storage 308 notifies the splitter 310 of the revert, the splitter 310 stops replication of the production volume V for a short period of time to avoid an inconsistent point in time. The revert may be reflected in the splitter 310 by the storage 308 setting a revert flag in the splitter 310.

The splitter 310 then reverts the production volume V to the snapshot S (420), typically as a result of a user action, after which the storage 308 will automatically notify the splitter 310 of the revert. As illustrated in FIG. 4B, to revert the production volume V to the snapshot S, the storage will consider the content of the volume V will to now be the content of the snapshot S (421), and the storage 308 will delete the production volume snapshot S as well as the old data of the production volume V (422) (i.e., there is no change in configuration; rather the production volume V remains with the same identity but gets the data from the snapshot S).

Returning to FIG. 4A, once the revert is completed, replication of the production volume (430) between the production site and the replication site according to the production site DPA 312 and the replication site DPA 324 may then resume. As described above, the snapshot S at this point has been erased and the volume V contains the data which was once the data of snapshot S. It should be noted that, for the revert, the host 304 is usually down (i.e., the host is shut down and does not generate any new I/O commands) because reverting from the production volume V to the snapshot S changes its underlying data.

In a further example embodiment illustrated in the flow diagram of FIG. 4C, before the storage 308 can complete reverting the snapshot S, to resume replication of the production volume V (e.g., step 430 of FIG. 4A), the storage 308 may notify the splitter 310 of dirty locations in the snapshot S (i.e., the locations which changed in volume V during the revert process) (431). Metadata of those dirty locations then may be tracked in the splitter 310 (432) and read from the splitter by the production site DPA 312 (433) to be synchronized with the replication volume V' (434). Likewise, to notify the splitter 310 that the revert is complete (e.g., step 420 of FIG. 4A), the storage 308 may take down the revert flag.

In another example embodiment, as illustrated in the flow diagram of FIG. 4D, when notifying the splitter that the production volume requires reverting to the snapshot, the storage 308 may cause the splitter 310 to transition into Marking on Host mode (436). In Marking on Host mode, the splitter 310 stops sending I/Os to the production volume V and the production site DPA 312. Rather, the I/Os are tracked in a bitmap or a metadata list in the splitter 310 instead of being sent to the storage 308 or the DPA 312. This stops replication immediately without losing any I/Os.

Additionally, the DPA 312 periodically queries the splitter 310 for its state. Accordingly, the DPA 312 discovers that the splitter 310 is in Marking on Host mode and the revert flag is set, according to the state returned by the splitter 310 from the DPA's 312 query. The DPA 312 then stops replication to the replication site. The storage 308 notifies splitter 310 of dirty locations in the snapshot S, which are tracked in memory by the splitter 310 (e.g., step 431 of FIG. 4C). For example, the storage 308 may notify the splitter 310 of a particular offset range that contains changes. Once the storage 308 completes notifying the splitter 310 of the dirty locations, the storage 308 notifies the splitter 310 that the revert is complete.

With the splitter 310 notified of dirty locations in the snapshot S for synchronization to the replication volume V', the revert is complete and the splitter 310 is notified (e.g., step 420 of FIG. 4A), such as by lowering the revert flag. Replication may now resume. The DPA 312, which periodically queries the splitter 310 for its state, then determines that the revert is complete and reads the dirty location metadata from the splitter 310 (437). For example, the DPA 312 may read the Marking on Host data into a delta marking stream in the production site journal 384 and begin replication by resynchronizing the dirty locations to the replication volume V' (438). The delta marking stream provides a greater amount of memory for the changes than the splitter and therefore is able to more accurately store the bitmaps and lists of changes. The storage 308 may then transition the splitter 310 from Marking on Host mode back to split mode (439) and replication may resume.

Figure 5:
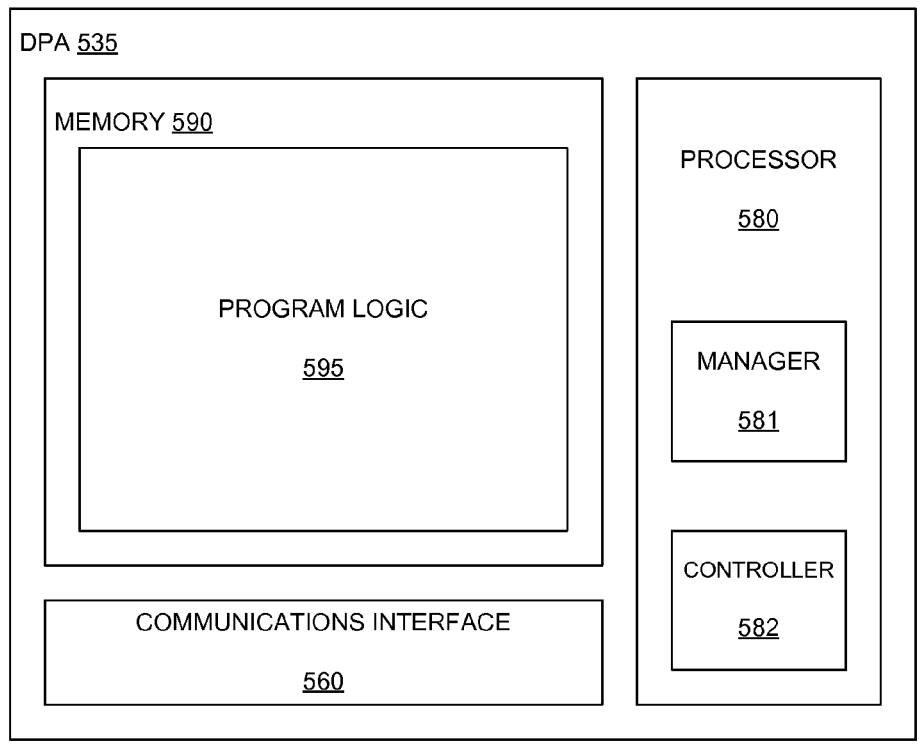
FIG. 5 is a block diagram of an example embodiment apparatus according to the present invention.

FIG. 5 is a block diagram of an example embodiment DPA 535 according to the present invention. The DPA includes memory 590 storing program logic for reverting from a production volume to a snapshot, a processor 580, a communications interface 560, a manager 581 and a controller 582.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 6:
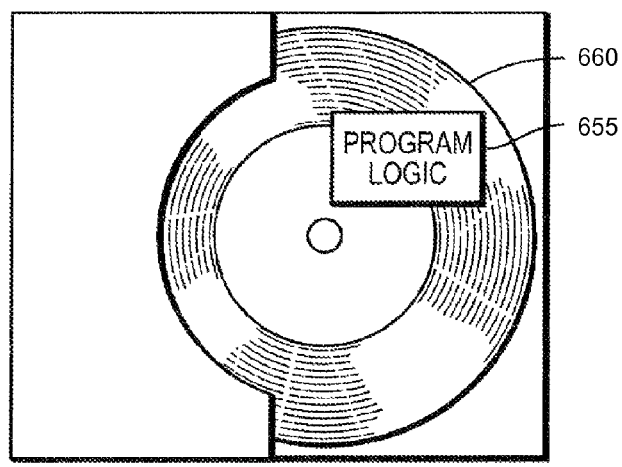
FIG. 6 is an illustration of an example embodiment of the present invention as embodied in program code.

FIG. 6 shows program logic 655 embodied on a computer-readable medium 660 as shown, and wherein the logic is encoded in computer-executable code configured for carrying out the methods for reverting from a production volume to a snapshot of this invention and thereby forming a computer program product 600.

The logic for carrying out the method may be embodied as part of the aforementioned system, which is useful for carrying out a method described with reference to embodiments shown in, for example, FIGS. 3 and 4A-4D. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for reverting from a production volume to a snapshot in a replication environment comprising a production site including the production volume, the snapshot, and a splitter, the method comprising:
   stopping replication of the production volume;
   setting a revert flag in the splitter;
   reverting the production volume to the snapshot by notifying the splitter of dirty locations in the snapshot and tracking metadata of the dirty locations in the splitter;
   clearing the revert flag to notify the splitter that the revert is completed; and
   resuming replication of the production volume.

2. The method of claim 1 wherein the replication environment further comprises a replication site including a replication volume and wherein resuming replication of the production volume further comprises:

reading the metadata from the splitter; and
synchronizing the dirty locations with the replication volume.

3. The method of claim 1 wherein stopping replication of the production volume comprises transitioning the splitter from a split mode to a marking on host mode.

4. The method of claim 3 wherein resuming replication of the production volume comprises:
transitioning the splitter from the marking on host mode to the split mode once the revert flag is cleared;
receiving dirty location metadata from the splitter for each dirty location in the snapshot; and
synchronizing the dirty locations to the replication volume.

5. The method of claim 1 wherein reverting the production volume to the snapshot comprises:
moving the data of the snapshot to the production volume; and
deleting the snapshot data and the old production volume data.

6. An apparatus for reverting from a production volume to a snapshot in a replication environment comprising a production site including the production volume, the snapshot, and a splitter, the apparatus comprising:
a controller configured to stop replication of the production volume,
set a revert flag in the splitter,
clear the revert flag to notify the splitter that the revert is completed, and
resume replication of the production volume after reverting the production volume to the snapshot; and
a manager configured to revert the production volume to the snapshot by notifying the splitter of dirty locations in the snapshot and tracking metadata of the dirty locations in the splitter.

7. The apparatus of claim 6 wherein the replication environment further comprises a replication site including a replication volume and wherein the controller is further configured to read the metadata from the splitter and synchronize the dirty locations with the replication volume.

8. The apparatus of claim 6 wherein the controller is further configured to transition the splitter from a split mode to a marking on host mode.

9. The apparatus of claim 8 wherein the controller is further configured to transition the splitter from the marking on host mode to the split mode, once the revert flag is cleared, receive dirty location metadata from the splitter for each dirty location in the snapshot and synchronize the dirty locations to the replication volume.

10. The apparatus of claim 6 wherein the manager is further configured to move the data of the snapshot to the production volume and delete the snapshot data and the old production volume data.

11. A computer-program product including a non-transitory computer-readable storage medium encoded with computer-program code that, when executed on a processor of a computer, cause the computer to revert from a production volume to a snapshot in a replication environment comprising a production site including the production volume, the snapshot, and a splitter, the computer-program code comprising:
computer-program code for stopping replication of the production volume;
computer-program code for setting a revert flag in the splitter;
computer-program code for reverting the production volume to the snapshot notifying the splitter of dirty locations in the snapshot and tracking metadata of the dirty locations in the splitter;
computer-program code for clearing the revert flag to notify the splitter that the revert is completed; and
computer-program code for resuming replication to the production volume.

12. The computer-program product of claim 11 wherein the replication environment further comprises a replication site including a replication volume and wherein computer-program code for resuming replication to the production volume further comprises:
computer-program code for reading the metadata from the splitter; and
computer-program code for synchronizing the dirty locations with the replication volume.

13. The computer-program product of claim 11 wherein computer-program code for stopping replication of the production volume comprises computer-program code for transitioning the splitter from a split mode to a marking on host mode and wherein computer-program code for resuming replication of the production volume to the snapshot comprises:
computer-program code for transitioning the splitter from the marking on host mode to the split mode once the revert flag is cleared;
computer-program code for receiving dirty location metadata from the splitter for each dirty location in the snapshot; and
synchronizing the dirty locations to the replication volume.

14. The computer-program product of claim 11 wherein computer-program code for reverting the production volume to the snapshot comprises:
computer-program code for moving the data of the snapshot to the production volume; and
computer-program code for deleting the snapshot data and the old production volume data.

* * * * *